(12) United States Patent
Kissell

(10) Patent No.: US 7,711,931 B2
(45) Date of Patent: May 4, 2010

(54) SYNCHRONIZED STORAGE PROVIDING MULTIPLE SYNCHRONIZATION SEMANTICS

(75) Inventor: Kevin D. Kissell, Le Bar sur Loup (FR)

(73) Assignee: MIPS Technologies, Inc., Sunnyvale, CA (US)

( * ) Notice: Subject to any disclaimer, the term of this patent is extended or adjusted under 35 U.S.C. 154(b) by 1048 days.

(21) Appl. No.: 10/954,988

(22) Filed: Sep. 30, 2004

(65) Prior Publication Data

US 2005/0251613 A1 Nov. 10, 2005
US 2007/0186028 A2 Aug. 9, 2007

Related U.S. Application Data

(63) Continuation-in-part of application No. 10/929,342, filed on Aug. 27, 2004, now Pat. No. 7,321,965, and a continuation-in-part of application No. 10/929,102, filed on Aug. 27, 2004, and a continuation-in-part of application No. 10/928,746, filed on Aug. 27, 2004, and a continuation-in-part of application No. 10/929,097, filed on Aug. 27, 2007, and a continuation-in-part of application No. 10/684,350, filed on Oct. 10, 2003, and a continuation-in-part of application No. 10/684,348, filed on Oct. 10, 2003, said application No. 10/929,342 is a continuation-in-part of application No. 10/684,350, filed on Oct. 10, 2003, and a continuation-in-part of application No. 10/684,348, filed on Oct. 10, 2003, said application No. 10/929,102 is a continuation-in-part of application No. 10/684,350, filed on Oct. 10, 2003, and a continuation-in-part of application No. 10/684,348, filed on Oct. 10, 2003, said application No. 10/928,746 is a continuation-in-part of application No. 10/684,350, filed on Oct. 10, 2003, and a continuation-in-part of application No. 10/684,348, filed on Oct. 10, 2003, said application No. 10/929,097 is a continuation-in-part of application No. 10/684,350, filed on Oct. 10, 2003, and a continuation-in-part of application No. 10/684,348, filed on Oct. 10, 2003.

(60) Provisional application No. 60/499,180, filed on Aug. 28, 2003, provisional application No. 60/502,358, filed on Sep. 12, 2003, provisional application No. 60/502,359, filed on Sep. 12, 2003.

(51) Int. Cl.
*G06F 9/30* (2006.01)
*G06F 12/00* (2006.01)

(52) U.S. Cl. ........................................ 712/226; 711/170

(58) Field of Classification Search .................. None
See application file for complete search history.

(56) References Cited

U.S. PATENT DOCUMENTS 4,817,051 A 3/1989 Chang (Continued)

FOREIGN PATENT DOCUMENTS

EP 0725334 A1 8/1996

(Continued)

OTHER PUBLICATIONS

Kisssell, Kevin D., "Microprocessor Forum (MPF) Conference Program Presentation: Architectural Extensions to the MIPS Architecture for High-Performance Embedded Systems" Oct. 15, 2003.

(Continued)

*Primary Examiner*—Gary J Portka
(74) *Attorney, Agent, or Firm*—Sterne, Kessler, Goldstein & Fox P.L.L.C.

(57) ABSTRACT

A shared resource access control system having a gating storage responsive to a plurality of controls with each of the controls derived from an instruction context identifying the shared resource, the gating storage including a plurality of sets of access method functions with each set of access method functions including a first access method function and a second access method function with the gating storage producing a particular one access method function from a particular one set responsive to the controls; and a controller, coupled to the gating storage, for controlling access to the shared resource using the particular one access method function.

74 Claims, 2 Drawing Sheets

U.S. PATENT DOCUMENTS

| | | | |
|---|---|---|---|
| 4,860,190 A | 8/1989 | Kaneda et al. | |
| 5,159,686 A | 10/1992 | Chastain et al. | |
| 5,295,265 A | 3/1994 | Ducateau et al. | |
| 5,428,754 A | 6/1995 | Baldwin | |
| 5,499,349 A | 3/1996 | Nikhil et al. | |
| 5,511,192 A | 4/1996 | Shirakihara | |
| 5,515,538 A | 5/1996 | Kleiman | |
| 5,659,786 A | 8/1997 | George et al. | |
| 5,727,203 A | 3/1998 | Hapner et al. | |
| 5,758,142 A | 5/1998 | McFarling et al. | |
| 5,799,188 A | 8/1998 | Manikundalam et al. | |
| 5,812,811 A | 9/1998 | Dubey et al. | |
| 5,835,748 A | 11/1998 | Orenstein et al. | |
| 5,867,704 A | 2/1999 | Tanaka et al. | |
| 5,892,934 A * | 4/1999 | Yard | 712/203 |
| 5,933,627 A | 8/1999 | Parady | |
| 5,944,816 A | 8/1999 | Dutton et al. | |
| 5,949,994 A | 9/1999 | Dupree et al. | |
| 5,961,584 A | 10/1999 | Wolf | |
| 6,061,710 A | 5/2000 | Eickemeyer et al. | |
| 6,088,787 A | 7/2000 | Predko | |
| 6,128,720 A * | 10/2000 | Pechanek et al. | 712/20 |
| 6,175,916 B1 | 1/2001 | Ginsberg et al. | |
| 6,189,093 B1 | 2/2001 | Ekner et al. | |
| 6,205,543 B1 | 3/2001 | Tremblay et al. | |
| 6,223,228 B1 | 4/2001 | Ryan et al. | |
| 6,240,531 B1 | 5/2001 | Spilo et al. | |
| 6,253,306 B1 | 6/2001 | Ben-Meir et al. | |
| 6,286,027 B1 | 9/2001 | Dwyer, III et al. | |
| 6,330,656 B1 | 12/2001 | Bealkowski et al. | |
| 6,330,661 B1 | 12/2001 | Torii | |
| 6,401,155 B1 | 6/2002 | Saville et al. | |
| 6,591,379 B1 | 7/2003 | LeVine et al. | |
| 6,643,759 B2 | 11/2003 | Andersson et al. | |
| 6,668,308 B2 | 12/2003 | Barroso et al. | |
| 6,671,791 B1 | 12/2003 | McGrath | |
| 6,675,192 B2 | 1/2004 | Emer et al. | |
| 6,687,812 B1 | 2/2004 | Shimada | |
| 6,697,935 B1 | 2/2004 | Borkenhagen et al. | |
| 6,738,796 B1 | 5/2004 | Mobini | |
| 6,779,065 B2 | 8/2004 | Murty et al. | |
| 6,877,083 B2 * | 4/2005 | Arimilli et al. | 711/203 |
| 6,889,319 B1 | 5/2005 | Rodgers et al. | |
| 6,920,634 B1 | 7/2005 | Tudor | |
| 6,922,745 B2 | 7/2005 | Kumar et al. | |
| 6,925,550 B2 | 8/2005 | Sprangle et al. | |
| 6,971,103 B2 | 11/2005 | Hokenek et al. | |
| 6,986,140 B2 | 1/2006 | Brenner et al. | |
| 6,993,598 B2 | 1/2006 | Pafumi et al. | |
| 7,020,879 B1 | 3/2006 | Nemirovsky et al. | |
| 7,065,094 B2 | 6/2006 | Petersen et al. | |
| 7,069,421 B1 * | 6/2006 | Yates et al. | 712/209 |
| 7,073,042 B2 | 7/2006 | Uhlig et al. | |
| 7,093,106 B2 | 8/2006 | Ambekar et al. | |
| 7,127,561 B2 | 10/2006 | Hill et al. | |
| 7,134,124 B2 | 11/2006 | Ohsawa et al. | |
| 7,152,170 B2 | 12/2006 | Park | |
| 7,181,600 B1 | 2/2007 | Uhler | |
| 7,185,183 B1 | 2/2007 | Uhler | |
| 7,185,185 B2 | 2/2007 | Joy et al. | |
| 7,203,823 B2 | 4/2007 | Albuz et al. | |
| 7,216,338 B2 | 5/2007 | Barnett et al. | |
| 7,321,965 B2 | 1/2008 | Kissell | |
| 7,376,954 B2 | 5/2008 | Kissell | |
| 7,386,636 B2 | 6/2008 | Day et al. | |
| 7,424,599 B2 | 9/2008 | Kissell | |
| 7,428,732 B2 | 9/2008 | Sandri et al. | |
| 2002/0083173 A1 | 6/2002 | Musoll et al. | |
| 2002/0083278 A1 | 6/2002 | Noyes | |
| 2002/0091915 A1 | 7/2002 | Parady | |
| 2002/0103847 A1 | 8/2002 | Potash | |
| 2002/0147760 A1 | 10/2002 | Torii | |
| 2002/0174318 A1 | 11/2002 | Stuttard et al. | |
| 2003/0014471 A1 | 1/2003 | Ohsawa et al. | |
| 2003/0074545 A1 | 4/2003 | Uhler | |
| 2003/0079094 A1 | 4/2003 | Rajwar et al. | |
| 2003/0093652 A1 | 5/2003 | Song | |
| 2003/0105796 A1 | 6/2003 | Sandri et al. | |
| 2003/0115245 A1 | 6/2003 | Fujisawa | |
| 2003/0126416 A1 | 7/2003 | Marr et al. | |
| 2003/0225816 A1 | 12/2003 | Morrow et al. | |
| 2004/0015684 A1 | 1/2004 | Peterson | |
| 2004/0139306 A1 | 7/2004 | Albuz et al. | |
| 2005/0050305 A1 | 3/2005 | Kissell | |
| 2005/0050395 A1 | 3/2005 | Kissell | |
| 2005/0120194 A1 | 6/2005 | Kissell | |
| 2005/0125629 A1 | 6/2005 | Kissell | |
| 2005/0125795 A1 | 6/2005 | Kissell | |
| 2005/0240936 A1 | 10/2005 | Jones et al. | |
| 2005/0251613 A1 | 11/2005 | Kissell | |
| 2005/0251639 A1 | 11/2005 | Vishin et al. | |
| 2006/0161421 A1 | 7/2006 | Kissell | |
| 2006/0161921 A1 | 7/2006 | Kissell | |
| 2006/0190945 A1 | 8/2006 | Kissell | |
| 2006/0190946 A1 | 8/2006 | Kissell | |
| 2006/0195683 A1 | 8/2006 | Kissell | |
| 2006/0206686 A1 | 9/2006 | Banerjee et al. | |
| 2007/0043935 A2 | 2/2007 | Kissell | |
| 2007/0044105 A2 | 2/2007 | Kissell | |
| 2007/0044106 A2 | 2/2007 | Kissell | |
| 2007/0106887 A1 | 5/2007 | Kissell | |
| 2007/0106988 A1 | 5/2007 | Kissell | |
| 2007/0106989 A1 | 5/2007 | Kissell | |
| 2007/0106990 A1 | 5/2007 | Kissell | |
| 2008/0140998 A1 | 6/2008 | Kissell | |

FOREIGN PATENT DOCUMENTS

| | | |
|---|---|---|
| EP | 0917057 A2 | 5/1999 |
| EP | 1089173 A2 | 4/2001 |
| JP | 8-249195 A | 9/1996 |
| JP | 2007-504536 | 3/2007 |
| WO | WO0153935 A1 | 7/2001 |
| WO | WO 03/019360 A2 | 3/2003 |
| WO | WO 2005/022385 A1 | 3/2005 |

OTHER PUBLICATIONS

Ungerer, Theo, et. al., "A Survey of Processors with Explicit Multithreading" ACM Computing Surveys, vol. 35, No. 1, Mar. 2003, pp. 29-63.

(webpage) Cray MTA-2 Historical Technical Papers, http://www.cray.com/products/programs/mta_2/resources.html (Mar. 12, 2005), (formerly http://www.cray.com/products/systems/mta/psdocs.html (Jul. 2, 2004)).

Carter, Larry, et. al., "Performance and Programming Experience on the Tera MTA," SIAM Conference on Parallel Processing, Mar. 1999.

Zaslavsky, Leonid, et. al., "A Scalable Approach for Solving Irregular Sparse Linear Systems on the Tera MTA Multithreaded Parallel Shared-Memory," Ninth SIAM Conference on Parallel Processing for Scientific Computing, San Antonio, TX, Mar. 1999.

Smith, Burton, "From Here to Petaflops,"Keynote Address, Petaflops-systems Operations Working Review, (POWR), Bodega Bay, California, Jun. 1998.

Briggs, Preston, "Tuning the BLAS for the Tera," Workshop on Multithreaded Execution, Architecture and Compilation, (MTEAC 98), Jan. 1998.

Alverson, Gail, et. al., "Tera Hardware-Software Cooperation," Supercomputing 1997, Nov. 1997.

Alverson, Gail, et. al., "Scheduling on the Tera MTA." IPPS '95 Workshop on Job Scheduling Strategies for Parallel Processing, Santa Barbara, CA, Apr. 1995, and in D.G. Feitelson and L. Rudolph, editors, Job Scheduling Strategies for Parallel Processiong, Lecture Notes in Computer Science vol. 949, pp. 19-44, Springer-Verlag, 1995.

Smith, Burton, "Folklore and Reality in High Performance Computing Slide Presentation," 1995.

Smith, Buron, "The Quest for General-Purpose Parallel Computing," 1994.

Alverson, Gail, et. al., "Exploiting Heterogeneous Parallelism on a Multithreaded Multiprocessor," 6th ACM International Conference on Supercomputing, Washington, DC, Jul. 1992.

Callahan, David, "Recognizing and Parallelizing Bounded Recurrences," Fourth Workshop on Languages and Compilers for Parallel Computing, pp. 169-184, Aug. 1991.

Callahan, David, et. al., "Register Allocation via Hierarchical Graph Coloring," ACM SIGPLAN '91 Conference on Programming Language Design and Implementation, Jun. 1991.

Alverson, Robert, "Integer Division Using Reciprocals," 10th IEEE Symposium on Computer Arithmetic, Jun. 1991.

Callahan, David, et. al., "Improving Register Allocation for Subscripted Variables," ACM SIGPLAN Conference on Programming Language Design and Implementation, Jun. 1990.

Alverson, Robert, et. al., "The Tera Computer System," ACM International Conference on Supercomputing, pp. 1-6, Jun. 1990.

Smith, Burton, "The End of Architecture," Keynote Address, 17th Annual Symposium on Computer Architecture, Seattle, Washington, May 1990.

Alverson, Gail, et. al., "A Future-Based Parallel Language for a General Purpose Highly Parallel Computer," Languages and Compilers for Parallel Computing, pp. 95-113, MIT Press, Cambridge, Massachusetts, 1990.

Engelshall, R.S., "pth GNU Portable Threads," PTH Manual, 'Online! Feb. 17, 2003, pp. 1-31 Retrieved from the Internet: URL:web.archive.org/web/20030318064847/http://www.gnu.org/software/pth/pth-manual.ps (Retrieved on Jan. 31, 2005).

Ishihara, T, et. al., "A Comparison of Concurrent Programming and Cooperative Multithreading," Euro-Par 200 Parallel Processing. 6th International Euro-Par Converence. Proceedings (Lecture Notes in Computer Science vol. 1900) Springer-Verlag Berlin, Germany, Sep. 1, 2000, pp. 729-738 (ISBN: 3-540-67956-1.

Frees, W., "Teilzeitareit IM Prozessor." Elektronik, Franzis Verlag GMBH, Munchen, DE, vol. 45, No. 9, Apr. 30, 1996 pp. 100-106, ISSN: 0013-5658.

"MIT Alewife Project: Home Page," retrieved from URL:catfish.csail.mit.edu/alewife/ on Jul. 2, 2004.

Arvind and R.A. Innaucci, "Two Fundamental Issues in Multiprocessing," in Proc. of DFVLR-Conf. 1987 on Par. Proc. in Science and Eng., Bonn-Bad Godesberg, W. Germany, Jun. 1987.

Fotland, David. A Multithreaded Wireless Network Processor with Software I/O. Embedded Processor Forum. Jun. 18, 2003. In-State MDR;www.MDRonline.com.

Marr et al. Hyper-Threading Technology. Intel Technology Journal, Feb. 14, 2002, vol. 6, No. 1, Intel Corporation, USA.

Sunsoft. Multithreaded Programming Guide. 1995. Sunsoft, A Sun Microsystems, Inc. Business. Mountainview, CA.

Mehl et al., "An Abstract Machine for Oz," Research Report RR-95-08, Online!, Jun. 1995, pp. 1-23, Kaiserslautem Saarbrucken, ISSN 0946-008.

Ungerer et al., "Utilising Parallel Resources By Speculation," Parallel and Distributed Processing, 1999. PDP '99. Proceedings of the Seventh Euromicro Workshop on Funchal, Portugal Feb. 3-5, 1999. Los Alamitos, CA, USA, IEEE Computing Society, Feb. 3, 1999, pp. 339-343.

Tsai et al: "The Superthreaded Architecture: Thread Pipelining with Run-Time Data Dependence Checking and Control Speculation," Parallel Architectures and Compiliation Techniques, 1996, Proceedings of the 1996 Conference in Boston, MA, USA, Oct. 20-23, 1996, Los Alamitos, CA, USA, IEEE Comput. Soc., Oct. 20, 1996, pp. 35-46.

Popov, Konstantin: "A Parallel Abstract Machine for the Thread-Based Concurrent Language Oz," Workshop on Parallism and Implementation of Technology for Constraint Logic Programming Languages, Sep. 1997, pp. 1-25.

Ubicom, Inc. A Next Generation Packet Processor for Wireless Networking. Apr. 15, 2003. UBICOM, Inc. Mountain View, CA, USA.

Bolychevsky et al. "Dynamic Scheduling in RISC Architectures." IEEE Proceedings Computers and Digital Techniques, vol. 143, No. 5. Sep. 24, 1996. pp. 309-317.

Patterson et al. "Computer Organization & Design: The Hardware/Software Interface." 1998. Morgan Kaufmann Publishers, Inc. Second Edition. pp. 592-593.

Silberschatz et al. "Operating Systems Concepts." 1994. Addison-Wesley Publishing Company. Fourth Edition. pp. 267-269, 271-272, 275.

Scheidhauer, Ralf, "Design, Implementierung und Evaluierung einer virtuellen Maschine fur Oz," Online!, Dec. 1998, Dissertation, Saarbrucken, (English-language version of the search report or action which indicates the degree of relevance found by the foreign office is appended.).

Heuring, Vincent P. and Jordan, Harry F. "Computer Systems and Architecture." Reading, Mass.: Addison Wesley Longman, Inc., © 1997. pp. 35-37.

Sunsoft. Multithreaded Programming Guide. 1994. Sunsoft, A Sun Microsystems, Inc. Business. Mountainview, CA. pp. 6, 12-13, 22-34 and 87.

Hennessy, John L. et al. "Computer Architecture A Quantitative Approach." Second Edition. San Francisco. CA: Morgan Kaufmann Publishers, Inc. 1996. pp. 70-73 and 87-89.

Zilles, Craig B. et al. "The Use of Multithreading for Exception Handling." *micro*, p. 219. 32nd Annual International Symposium on Microarchitecture.

Dorai, Gautham K. et al. "Transparent Threads: Resource Sharing in SMT Processors for High Single-Thread Performance." Proceedings of the International Conference on Parallel Architectures and Compilation Techniques 2002.

MIPS32™ Architecture For Programmers vol. II The MIPS32™ Instruction Set. Revision 2.00. pp. 231 & 311. Document No. MD00086. Jun. 9, 2003. MIPS Technologies, Inc.

Agarwal, A. et al., "April: A Processor Architecture for Multiprocessing," ACM SIGARCH Computer Architecture News, AMC, vol. 18, Issue 3a, pp. 104-114, Jun. 1990.

Culler, D.E., et al., Two Fundamental Limits on Dataflow Multiprocessing, 1993, Report No. UCB/CSD 92/716, pp. 1-14.

English Translation of Notice of Rejection for Japanese Patent Application No. 2006-524929, dated Nov. 28, 2008, 4 pages.

English Abstract of Japanese Patent Publication No. 2007-504536, published Sep. Mar. 1, 2007, 1 page.

Exception Handler, from Free Online Dictionary of Computing, 1 page, Oct. 31, 1994.

Kissell, K.D., *MIPS MT: A Multithreaded RISC Architecture for Embedded Real-Time Processing*, "High Performance Embedded Architectures and Compilers," Spring, vol. 4917/2008, pp. 9-21, 2008.

Kwak, H. et al., "Effects of Multithreading on Cache Performance," Computers, IEEE Transaction on, IEEE, vol. 48, Issue 2, pp. 176-184, Feb. 1999.

Lee, B. et al., "Simulation Study of Multithreaded Virtual Processor," LASTED International Conference on Parallel and Distributed Systems (Euro-PDS), pp. 1-6, Jul. 3, 1998.

MIPS32® Architecture for Programmers, vol. III: The MIPS32® Privileged Resource Architecture, Revision 2.50, Jul. 1, 2005, MIPS Technologies, Inc., 137 pages.

MIPS32® Architecture for Programmers, vol. IV-f: The MIPS® MT Application-Specific Extension to the MIPS32® Architecture, Revision 1.00, Sep. 28, 2005, MIPS Technologies, Inc., 83 pages.

Teller et al., Locating Multiprocessor TLBs at Memory, IEEE, Proc. of the Twenty-Seventh Annual Hawaii International Conference on System Sciences, 1994, pp. 554-563.

Thiébaut, D. et al., Improving Disk Cache Hit-Ratios Through Cache Partitioning, IEEE Transactions on Computers, vol. 41, No. 6 (1992), pp. 665-676.

Office Communication, dated Dec. 19, 2006, for U.S. Appl. No. 10/955,231, filed Sep. 30, 2004, 19 pages.

Office Communication, dated Aug. 9, 2007, for U.S. Appl. No. 10/955,231, filed Sep. 30, 2004, 23 pages.

Office Communication, dated Mar. 6, 2007, for U.S. Appl. No. 11/330,914, filed Jan. 11, 2006, 21 pages.

Office Communication, dated Jul. 20, 2007, for U.S. Appl. No. 11/330,914, filed Jan. 11, 2006, 27 pages.
Office Communication, dated May 15, 2008, for U.S. Appl. No. 11/615,960, filed Dec. 23, 2006, 17 pages.
Office Communication, dated Dec. 8, 2008, for U.S. Appl. No. 11/615,960, filed Dec. 23, 2006, 15 pages.
Office Communication, dated Apr. 10, 2009, for U.S. Appl. No. 11/615,960, filed Dec. 23, 2006, 16 pages.
Office Communication, dated Oct. 17, 2008, for U.S. Appl. No. 11/615,963, filed Dec. 23, 2006, 16 pages.
Office Communication, dated Apr. 3, 2009, for U.S. Appl. No. 11/615,963, filed Dec. 23, 2006, 15 pages.
Office Communication, dated Oct. 15, 2008, for U.S. Appl. No. 11/615,964, filed Dec. 23, 2006, 18 pages.
Office Communication, dated Apr. 13, 2009, for U.S. Appl. No. 11/615,964, filed Dec. 23, 2006, 16 pages.
Office Communication, dated Oct. 16, 2008, for U.S. Appl. No. 11/615,965, filed Dec. 23, 2006, 17 pages.
Office Communication, dated Apr. 9, 2009, for U.S. Appl. No. 11/615,965, filed Dec. 23, 2006, 16 pages.
Office Communication, dated Dec. 22, 2008, for U.S. Appl. No. 11/949,603, filed Dec. 3, 2007, 8 pages.
Callahan, D. and Smith, B., "A Future-Based Parallel Language for a General Purpose Highly Parallel Computer," *Languages and Compilers for Parallel* Computing, pp. 95-113, MIT Press, Cambridge, Massachusetts, 1990.
English Abstract of Japanese Patent Publication No. 8-249195, published Sep. 27, 1996, 1 page.
Frees, W., "Teilzeitarbeit im Prozessor," *Electronik*, Franzis Verlag GMBH. Munche, DE, vol. 45, No. 9, Apr. 30, 1996, pp. 100-106, XP000595386, ISSN: 0013-5658.
Kane, G. and Heinrich, J., *MIPS RISC Architecture*, Prentice Hall, Upper Saddle River, New Jersey, 1992. (entire book submitted).
Kissell, K.D., *Microprocessor Forum (MPF) Conference Program Presentation: Architectural Extensions to the MIPS Architecture for High-Performance Embedded Systems*, 14 pages, Oct. 15, 2003.
Kissell, K.D., U.S. Appl. No. 12/605,201, filed Oct. 23, 2009, entitled "Apparatus, Method, and Instruction for Initiation of Concurrent Instruction Streams in a Multithreading Microprocessor," 34 pages.
Scheidhauer, R., "Design, Implementierung and Evaluierung einer virtuellen Maschine fur Oz," Online!, 9 pages, Dec. 1998, Dissertation, Saarbrucken.
Smith, B., "From Here to Petaflops." Keynote Address, Petaflops-systems Operations Working Review, (POWR), Bodega Bay, California, 16 pages, Jun. 1998.
Sweetman, D., *See MIPS Run*, Morgan Kaufmann Publishers, San Francisco, CA (1999). (entire book submitted).
Office Communication, dated Jul. 6, 2009, for U.S. Appl. No. 11/615,960, filed Dec. 23, 2006, 16 pages.
Office Communication, dated Oct. 16, 2009, for U.S. Appl. No. 11/615,963, filed Dec. 23, 2006, 5 pages.
Office Communication, dated Oct. 20, 2009, for U.S. Appl. No. 11/615,964, filed Dec. 23, 2006, 5 pages.
Search Report and Written Opinion, dated Jan. 25, 2005, for PCT Appl. No. PCT/US2004/027827, filed Aug. 27, 2004, 14 pages.
Search Report, dated Feb. 18, 2005, for PCT Appl. No. PCT/US2004/029272, filed Aug. 26, 2004, 9 pages.
Haggander, D. et al., "Optimizing Dynamic Memory Management in a Multithreaded Application Executing on a Multiprocessor," *Proceedings of the International Conference on Parallel Processing*, Aug. 10-14, 1998, pp. 262-269.

* cited by examiner

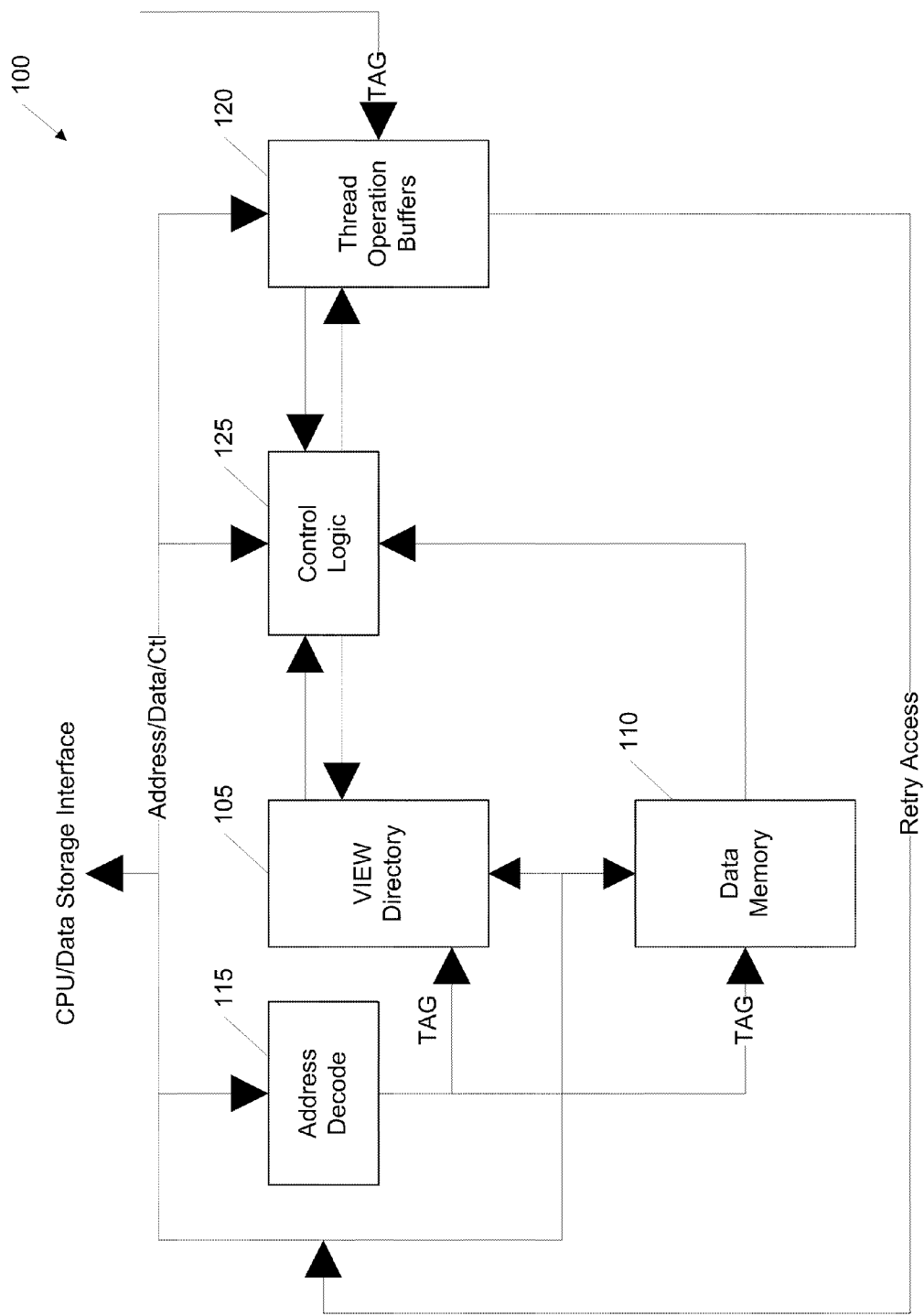
FIGURE_1

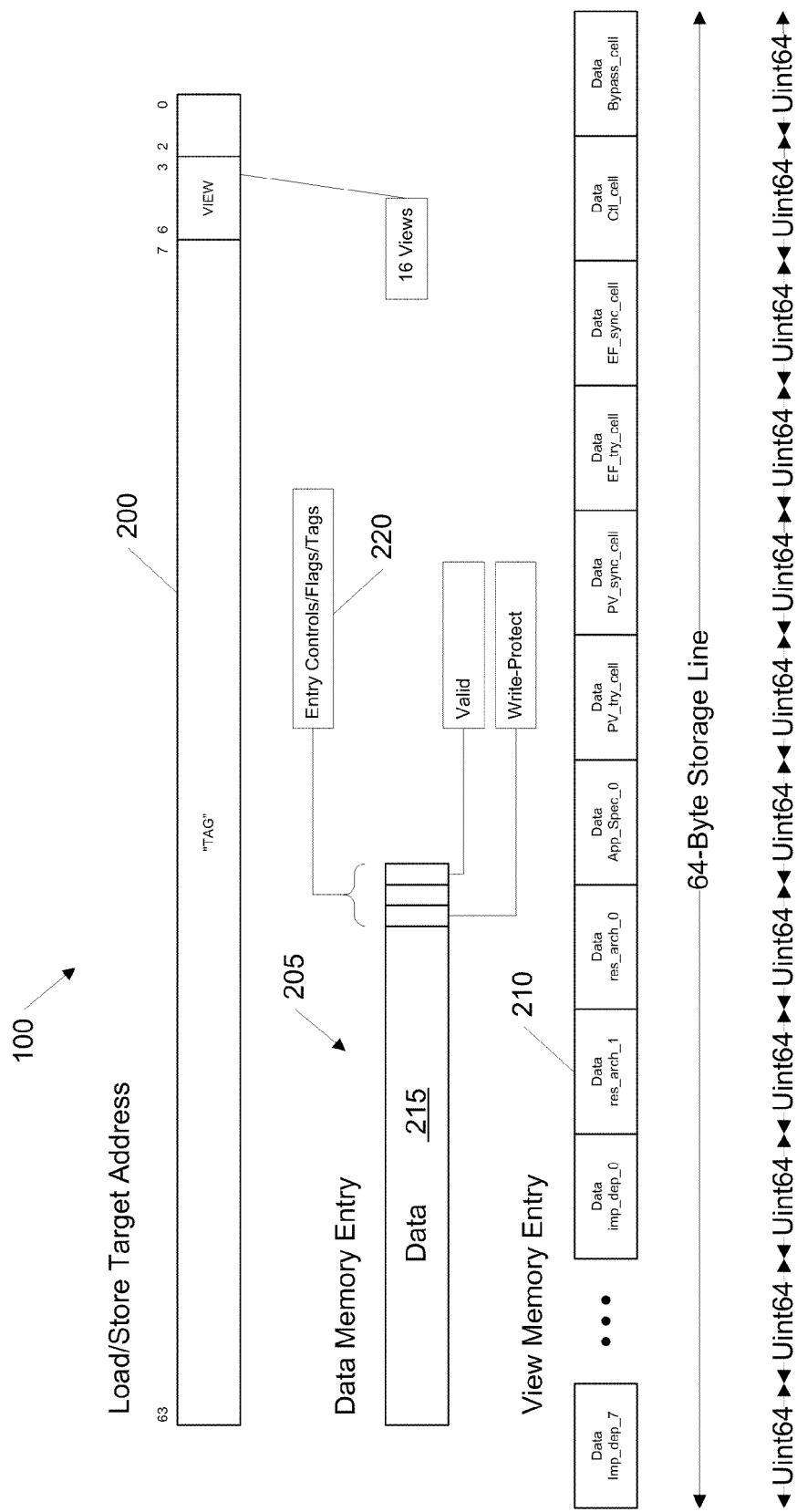
FIGURE_2

SYNCHRONIZED STORAGE PROVIDING MULTIPLE SYNCHRONIZATION SEMANTICS

CROSS REFERENCE TO RELATED APPLICATIONS

This application is a continuation-in-part (CIP) of the following co-pending Non-Provisional U.S. patent applications, which are hereby expressly incorporated by reference in their entireties for all purposes:

| Ser. No. | Filing Date | Title |
| --- | --- | --- |
| 10/929,342 | 27 Aug. 2004 | INTEGRATED MECHANISM FOR SUSPENSION AND DEALLOCATION OF COMPUTATIONAL THREADS OF EXECUTION IN A PROCESSOR |
| 10/929,102 | 27 Aug. 2004 | MECHANISMS FOR DYNAMIC CONFIGURATION OF VIRTUAL PROCESSOR RESOURCES |
| 10/928,746 | 27 Aug. 2004 | APPARATUS, METHOD, AND INSTRUCTION FOR INITIATION OF CONCURRENT INSTRUCTION STREAMS IN A MULTITHREADING MICROPROCESSOR |
| 10/929,097 | 27 Aug. 2004 | MECHANISMS FOR SOFTWARE MANAGEMENT OF MULTIPLE COMPUTATIONAL CONTEXTS |

This application is a continuation-in-part (CIP) of the following co-pending Non-Provisional U.S. patent applications, which are hereby expressly incorporated by reference in their entireties for all purposes:

| Ser. No. | Filing Date | Title |
| --- | --- | --- |
| 10/684,350 | 10 Oct. 2003 | MECHANISMS FOR ASSURING QUALITY OF SERVICE FOR PROGRAMS EXECUTING ONA MULTITHREADED PROCESSOR |
| 10/684,348 | 10 Oct. 2003 | INTEGRATED MECHANISM FOR SUSPENSION AND DEALLOCATION OF COMPUTATIONAL THREADS OF EXECUTION INA PROCESSOR |

Each of the applications identified in the first paragraph is a continuation-in-part (CIP) of each of the following co-pending Non-Provisional U.S. patent applications, which are hereby expressly incorporated by reference in their entireties for all purposes:

| Ser. No. | Filing Date | Title |
| --- | --- | --- |
| 10/684,350 | 10 Oct. 2003 | MECHANISMS FOR ASSURING QUALITY OF SERVICE FOR PROGRAMS EXECUTING ONA MULTITHREADED PROCESSOR |
| 10/684,348 | 10 Oct. 2003 | INTEGRATED MECHANISM FOR SUSPENSION AND DEALLOCATION OF COMPUTATIONAL THREADS OF EXECUTION INA PROCESSOR |

Each of the co-pending Non-Provisional U.S. patent applications identified in the first two paragraphs above claim the benefit of the following U.S. Provisional Applications, which are hereby expressly incorporated by reference in their entireties for all purposes:

| Ser. No. | Filing Date | Title |
|---|---|---|
| 60/499,180 | 28 Aug. 2003 | MULTITHREADING APPLICATION SPECIFIC EXTENSION |
| 60/502,358 | 12 Sep. 2003 | MULTITHREADING APPLICATION SPECIFIC EXTENSION TO A PROCESSOR ARCHITECTURE |
| 60/502,359 | 12 Sep. 2003 | MULTITHREADING APPLICATION SPECIFIC EXTENSION TO A PROCESSOR ARCHITECTURE |

This application is related to the following Non-Provisional U.S. patent applications:

| Ser. No. (Client Ref.) | Filing Date | Title |
|---|---|---|
| 10/955,231 | 30 Sep. 2004 | A SMART MEMORY BASED SYNCHRONIZATION CONTROLLER FOR A MULTI-THREADED MULTIPROCESSOR SOC |

All of the above-referenced related patent applications and priority patent applications are hereby expressly incorporated by reference in their entireties for all purposes.

FIELD OF THE INVENTION

The invention relates generally to multiprocessing systems and more specifically to multiple thread synchronization activities on one or more processing elements (real, virtual, or otherwise).

BACKGROUND OF THE INVENTION

Multiprocessing systems continue to become increasingly important in computing systems for many applications, including general purpose processing systems and embedded control systems. In the design of such multiprocessing systems, an important architectural consideration is scalability. In other words, as more hardware resources are added to a particular implementation the machine should produce higher performance. Not only do embedded implementations require increased processing power, many also require the seemingly contradictory attribute of providing low power consumption. In the context of these requirements, particularly for the embedded market, solutions are implemented as "Systems on Chip" or "SoC." The assignee of the present application, MIPS Technologies, Inc., offers a broad range of solutions for such SoC multiprocessing systems.

In multiprocessing systems, loss in scaling efficiency may be attributed to many different issues, including long memory latencies and waits due to synchronization. The present invention addresses improvements to synchronization among threads in a multithreaded multiprocessing environment, particularly when individual threads may be active on one or more multiple processors, on a single processor but distributed among multiple thread contexts, or resident in memory (virtualized threads).

Synchronization in a multithreaded system refers to the activities and functions of such a multiplicity of threads that coordinate use of shared system resources (e.g., system memory and interface FIFOs) through variables storing "state" bits for producer/consumer communication and mutual exclusion (MUTEX) tasks. Important considerations for implementing any particular synchronization paradigm include designing and implementing structures and processes that provide for deadlock-free operation while being very efficient in terms of time, system resources, and other performance measurements.

Details regarding the MIPS processor architecture are provided in the following document, which is incorporated by reference in its entirety for all purposes: D. Sweetman, See MIPS Run, Morgan Kaufmann Publishers, Inc. (1999).

The difficulty of finding a hardware synchronization solution for a RISC processor is compounded by the nature of the RISC paradigm. A CISC paradigm is easier, in some ways, to adapt hardware resources to particular problems because the instruction set may be extended virtually without limit as instructions and operands in an instruction pipeline may be of variable length. A designer that wants to implement a special hardware synchronization instruction set is able to add new synchronization instructions easily as many CISC instruction sets already contemplate extensions to basic instruction sets. However, that solution is generally not available to designers working with RISC instruction sets. Most instructions sets are filled or nearly filled with vacancies judiciously filled after many factors are extensively considered and evaluated. What is needed is a system for extending or enhancing existing instruction sets, with such a solution particularly useful in the RISC environment, but not exclusively useful as the CISC environment may also benefit from instruction set extension.

SUMMARY OF THE INVENTION

The present invention has been made in consideration of the above situation, and has as an object to provide a system, method, computer program product, and propagated signal which efficiently, in a specific embodiment, enables inter-thread synchronization among a plurality of threads that may be active on one or more of: multiple processors, on a single processor but distributed among multiple thread contexts, and/or resident in memory (virtualized threads) without deadlock. In a more generalized description of the preferred embodiment, a system, method, computer program, and propagated signal which efficiently enables extension of instructions and classes of instructions.

A preferred embodiment of the present invention includes a shared resource access control system having a gating storage responsive to a plurality of control bits with the control bits derived from an access reference identifying the shared resource, the gating storage including a plurality of sets of views with each set of views including a first view and a second view with the gating storage producing a particular view from a particular one set responsive to the control bits; and a controller, coupled to the gating storage, for controlling access to the shared resource using the particular one view.

Another preferred embodiment of the present invention includes a shared resource access control method, the method applying an access instruction for the data storage location to a memory system, the memory system including a plurality of data storage locations, each the data storage location associated with a set of views including a first view and a second view with the memory system producing a particular one view from a particular one set of views associated with the data storage location responsive to a set of control bits derived from an address identifying the data storage location; producing the particular one view from the particular one set of views; and controlling access to the data storage location using the particular one view.

Preferred embodiments of the present also include both a computer program product having a computer readable medium carrying program instructions for accessing a memory when executed using a computing system, the executed program instructions executing a method, as well as a propagated signal on which is carried computer-executable instructions which when executed by a computing system performs a method, the method including applying an access instruction for the data storage location to a memory system, the memory system including a plurality of data storage locations, each the data storage location associated with a set of views including a first view and a second view with the memory system producing a particular one view from a particular one set of views associated with the data storage location responsive to a set of control bits derived from an address identifying the data storage location; producing the particular one view from the particular one set of views; and controlling access to the data storage location using the particular one view.

An alternate preferred embodiment includes an apparatus for extending a load/store instruction having a target address, the apparatus including a memory system having a view associated with a data storage location identified by a tag derived from the target address, the data storage location associated with the load/store instruction, the memory system responsive to the target address to produce a particular view for the load/store instruction from the memory system; and a controller, coupled to the data storage location and to the memory system, for implementing a an load/store method for the load/store instruction using the particular view.

Other preferred embodiments include a method, and both a computer program product and a propagated signal carrying computer-executable instructions for extending an instruction using an instruction rule when executed by a computing system, the computer-executable instructions implementing a method. This method including producing, responsive to the target address, a particular view for the load/store instruction from a memory system, the memory system having a view associated with a data storage location identified by a tag derived from the target address, the data storage location associated with the load/store instruction; and implementing a load/store method for the load/store instruction using the particular view.

BRIEF DESCRIPTION OF THE DRAWINGS

FIG. 1 is a schematic block diagram of a preferred embodiment for a gating storage system; and FIG. 2 is a schematic diagram illustrating a preferred implementation for an example of a bit assignment of the data elements shown in FIG. 1.

DESCRIPTION OF THE PREFERRED EMBODIMENT

The present invention relates to multiple thread synchronization activities on one or more processing elements. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Data-driven programming models map well to multi-threaded architectures. For example, threads of execution are able to read data from memory-mapped I/O FIFOs, and may be suspended for as long as it takes for a FIFO to fill, while other threads continue to execute. When the data is available, the load completes, and the incoming data may be processed directly in the load destination register without requiring any I/O interrupt service, polling, or software task scheduling.

However, many architecture models have no provision for restartably interrupting a memory operation once a memory management unit has processed it. It would thus be impossible for a thread context of a blocked thread to be used by an exception handler, or for an operating system to swap out and re-assign such a thread context. The preferred embodiment of the present invention therefore introduces a specific implementation of a concept of "Gating Storage"—memory (or memory-like devices) that are tagged in the TLB (with extended bits or direct physical decode) as potentially requiring abort and restart of loads or stores. The abort/restart capability may require explicit support from the processor/memory interface protocols. It should be noted that in some implementations the memory is not tagged in a memory management unit; rather the memory may be direct mapped or otherwise identified.

The gating storage, as described herein, is a special case of a more generalized concept. As described herein, the gating storage may be conceptualized as a physical address subspace with special properties. In the specific examples described above and as set forth in more detail below, this gating storage serves as an Inter-Thread Communication (ITC) storage for enabling thread-to-thread and thread-to-I/O synchronization, particularly for load/store instructions. Each 64-bit location or "cell" within this gating storage space appears at multiple consecutive addresses, or "views", distinguished by "view" bits (e.g., bits [6:3] though other implementations may use more, fewer, or different bits) of the load/store target address. Each view may have distinct semantics for the same instruction. A fundamental property of the gating storage is that loads and stores may be precisely view-referenced by the load or store. Any blocked loads and stores resume execution when the actions of other threads of execution, or possibly those of external devices, result in the completion requirements being satisfied. As gating storage references, blocked ITC loads and stores can be precisely aborted and restarted by systems software.

This structure has several motivations:
1. Issue bandwidth is a critical resource on multithreaded processors. Whereas spinning on a lock in a true multiprocessor system wastes only the issue bandwidth of the processor waiting on the resource, in a multithreaded processor, the act of polling the lock on the resource consumes issue bandwidth needed by the program thread holding the lock, and further delays the release of the resource. A thread blocked waiting on a value in gating storage consumes no issue bandwidth until the value is produced or consumed.
2. Using hardware synchronization reduces the overhead of inter-thread control and data exchanges and makes finer grained parallel computations economical. A well-behaved algorithm running on an optimal implementation may pass values between threads at a cost of a single pipelined load or store cycle for each thread.
3. It allows a "push model" of multiprocessor/multithread data flow to be implemented in a near-optimal way.

For example, in some views, cells within gating storage space may be "Empty" or "Full". A load from a cell that is Empty causes the thread issuing the load to be suspended until the cell is written to by a store from another thread. A store to a cell, when Full, causes the thread issuing the store to be suspended until a previous value has been consumed by a load.

Such gating storage may define independent Empty and Full conditions, rather than a single Empty/Full bit, in order to allow for FIFO buffered gating storage. In a classical Empty/Full memory configuration, Empty would simply be the negation of Full. A FIFO cannot be both Empty and Full, but it is able to be neither Empty nor Full when it contains some data, but could accept more.

It is possible that one view in an implementation is a standard empty/full synchronization construct for producers and consumers. Another view may implement classical "P/V" semaphores by blocking loads even of "full" cells when the value of the cell is zero. Other views might implement atomic semaphore "get" and "put", or fetch-and-increment or fetch-and-decrement operations without blocking, among other types, variations, and implementations of synchronization constructs.

As discussed above, a load/store target address may designate gating storage through a direct decode or use of special TLB entries. References to virtual memory pages whose TLB entries are tagged as gating storage resolve not to standard memory, but to a store with special attributes. Each page maps a set of 1-64 64-bit storage locations, called "cells", each of which may be accessed in one of a multiplicity of ways, called "views" using standard load and store instructions. The view is encoded in the low order (and untranslated) view bits of a generated virtual address for the load/store target address. As included in the preferred embodiment of the present invention, a fundamental property of the gating storage is that it synchronizes executions streams. Loads and stores to/from a memory location in gating storage, as implemented, block until the state of the cell corresponds to the required conditions for completion in the selected view. A blocked load or store may be precisely aborted when necessary, and restarted by the controlling operating system when appropriate.

Each cell of the gating storage has Empty and Full Boolean states associated with it. The cell views are then defined as follows.

TABLE I

CELL VIEW DEFINITIONS

| Address Bits [6:3] View BIT Value | Gating Storage Behavior |
|---|---|
| 2#0000 | Bypass: Loads/Stores do not block, and do not affect Empty/Full |
| 2#0001 | Control: Read or Write of Status/Control Information. The bit layout described below is guaranteed valid only when the Control view is referenced via LW/SW or LD/SD instructions<br>Data<br>Bits  Meaning<br>0  When set, cell is Empty and will block on an attempt to load as synchronized storage<br>1  When set, cell is Full and will block on an attempt to store as synchronized storage<br>15:2  Reserved for future architectural definition<br>63:16  Implementation Dependent State |
| 2#0010 | Empty/Full Synchronized view. Loads cause the issuing thread to block when cell is Empty, and set the Empty state on returning the last available load value. Stores block when the cell is Full, and set the Full state on accepting the last possible store value. Minimally, a cell contains a single value, such that the Empty bit is the complement of the Full bit. |
| 2#0011 | Empty/Full Storage "Try" view. Loads return a value of zero when cell is Empty, regardless of actual data contained. Otherwise Load behavior is same as in Empty/Full Synchronized view. Normal Stores to Full locations through the E/F Try view fail silently to update the contents of the cell, rather than block the thread. SC (Store Conditional) instructions referencing the E/F Try view indicate success or failure based on whether the ITC store succeeds or fails. |
| 2#0100 | P/V Synchronized view. Loads and stores do not modify the Empty and Full bits, both of which should be cleared as part of cell initialization for P/V semaphore use. Loads return the current cell data value when the value is non-zero, and cause an atomic |

TABLE I-continued

CELL VIEW DEFINITIONS

| Address Bits [6:3] View BIT Value | Gating Storage Behavior |
|---|---|
| | post-decrement of the value. When the cell value is zero, loads block until the cell takes a non-zero value. Stores cause an atomic increment of the cell value, up to a maximal value at which they saturate. The width of the incremented/decremented field within the ITC cell need not be the full 32 or 64-bit width of the cell. It preferably, however, implements at least 15 bits of unsigned value |
| 2#0101 | P/V Storage "Try" view. Loads and stores do not modify the Empty and Full bits, both of which should be cleared as part of cell initialization for P/V semaphore use. Loads return the current cell data value, even when zero. When the load value is non-zero, an atomic post-decrement is performed of the value. Stores cause a saturating atomic increment of the cell value, as described for the P/V Synchronized view, and cannot fail |
| 2#0110 | Architecturally Reserved View 0 |
| 2#0111 | Architecturally Reserved View 1 |
| 2#1000 | Application or Implementation Specific View 0 |
| ... | Application or Implementation Specific View X |
| 2#1111 | Application or Implementation Specific View 7 |

Each storage cell could thus be described by the C structure:

```
struct {
    uint64 bypass_cell
    uint64 ctl_cell
    uint64 ef_sync_cell;
    uint64 ef_try_cell;
    uint64 pv_synch_cell;
    uint64 pv_try_cell;
    uint64 res_arch[2]
    uint64 imp_dep[8]
} ITC_cell;
``` where all sixteen of the elements reference the same sixty-four bits of underlying storage data. References to this storage may have access types of less than sixty-four bits (e.g. SW/LW, SH/LH SB/LB), with the same Empty/Full protocol being enforced on a per-access basis. Store/Load pairs of the same data type to a given ITC address will always reference the same data, but the byte and halfword ordering within words, and the word ordering within 64-bit doublewords, may be implementation and endianness-dependent, i.e. a SW followed by a LB from the same ITC address is not guaranteed to be portable. While the design of ITC storage allows references to be expressed in terms of C language constructs, compiler optimizations may generate sequences that break ITC protocols, and great care must be taken if ITC is directly referenced as "memory" in a high-level language.

Systems that do not support 64-bit loads and stores need not implement all 64 bits of each cell as storage. When only 32 bits of storage are instantiated per cell, it must be visible in the least significant 32-bit word of each view, regardless of the endianness of the processor, while the results of referencing the most significant 32-bits of each view are implementation-dependent. Ignoring the 22 bit of the address on each access can satisfy this requirement. In this way a C language cast from a unit 64 to a unit 32 reference will acquire the data on both big-endian and little-endian CPU configurations. When more than 32 bits of Control view information are required in a 32-bit ITC store, the additional control bits should be referenced using one of the implementation-dependent views. Empty and Full bits are distinct so that decoupled multi-entry data buffers, such as FIFOs can be mapped into ITC storage.

The gating storage may be saved and restored by copying the {bypass_cell, ctl_cell} pair to and from general storage. While the full data width, 64 or 32 bits, of bypass_cell must be preserved, strictly speaking, only the least significant bits of the ef_state need to be manipulated. In the case of multi-entry data buffers (e.g. FIFOs), each cell must be read using an Empty/Full view until the Control view shows the cell to be Empty to drain the buffer on a copy. The FIFO state can then be restored by performing a series of Empty/Full stores to an equivalent FIFO cell starting in an Empty state. Implementations may provide depth counters in the implementation-specific bits of the Control view to optimize this process. Software must ensure that no other accesses are made to ITC cells during the save and restore processes.

The "physical address space" of gating storage may be made global across all VPEs and processors in a multiprocessor system as shown and described above, such that a thread is able to synchronize on a cell on a different VPE from the one on which it is executing. Global gating storage addresses could be derived from a CPUNum field of an EBase register of each VPE. CPUNum includes ten bits that correspond to the ten significant bits of storage address into the gating storage. Processors or cores designed for uniprocessor applications need not export a physical interface to the gating storage, and may treat the gating storage as a processor-internal resource.

FIG. 1 is a schematic block diagram of a preferred embodiment for a gating storage system 100 including a view directory 105. View directory 105 contains the view as discussed above for load/store instructions implementing synchronization methods through use of system 100. A data memory 110 includes an associated data block for any gating storage data. An address decoder 115 generates the tag, from an instruction or an instruction operand, as an address offset of a block within a page. An instruction that potentially references the gating storage space causes view directory 105 to be cycled at the tag generated from the operand of the instruction. Any gating storage operation is aborted when decoder 115 resolves the virtual address translation to non-gating system 100. When the instruction is a load/store instruction, the operand is a target address within gating storage system 100, the operand-identified function is one of the views (e.g., EF Synchronization View), and when the instruction operation is not blocked, i.e. a load from a non-Empty cell or a store to a non-Full cell, a data transfer is performed relative to data memory 110 on a subsequent cycle. Otherwise, the instruction is recorded in a thread operation buffer 120 and the thread is suspended. Changes in gating storage system 100 that may affect suspended threads are retried. For example, each change of an empty/full state of a location in data memory 110 causes the affected address to be broadcast to thread operation buffers 120, where it is compared against the addresses of blocked operations. Those operations that become unblocked are retried against the new tag state, and when they succeed, the content of the particular thread operation buffer 120 is de-allocated and the associated thread unblocked by completion of the GS instruction operation. A control logic function 125 arbitrates between retries and new requests.

This style of implementation allows a gating storage system "hit" where data memory 110 is already in the state desired, to have the same timing as a cache hit, but it presupposes tight integration with an instruction generation source, for example with a processor core. Less closely coupled implementations of gating storage system 100, where the gating storage block is instantiated more like a scratchpad RAM or an I/O device supporting a gating storage protocol, would be less core-intrusive, but may also stall the pipeline even on a "hit".

FIG. 2 is a schematic diagram illustrating a preferred implementation for a bit assignment of the data elements shown in FIG. 1. For example, when the applicable instruction is a load/store instruction targeting a memory location within data memory 110, the instruction operand includes a target address 200. In a preferred embodiment address 200 is sixty-four bits long, with a subset of bits of low order, e.g., untranslated bits [6:3] of the target address and a subset of bits of high order used as the tag or index. Other implementations may vary some, all, or none of these values. As a generalization, an operand (i.e., a target address) of a load/store instruction into gating storage 100 is sometimes referred to herein as an access reference. Controls derived from this access reference include the tag, and the view, though in other implementations, the access reference and the controls may have different constructions and/or configurations from these preferred implementations.

View directory 105 is a special memory for views, also referred to herein as access method functions. An entry of directory 105 includes a view memory entry 210. An entry of memory 110, also referred to herein as a data storage location, holds data at an address derived from target address 200 and may include entry controls/flags/tags 220. As shown in FIG. 2, each entry 205 includes data 215 and one or more entry controls (e.g., bits or flags) 220. Entry controls may include constructs such as a write-protect bit, a validity bit, control flag bit(s) discussed above that may modify operation of control logic 125 (e.g., a number of times to spin prior to an abort/exception), and/or other tags bits.

Each entry 210 includes a multiplicity of eight-byte views, any particular one of which is selectable by the value of the view bits [6:3] of the instruction operand. Further discussion of these views appears below, however for now it is sufficient to understand that each of the views is used to alter/enhance/modify the affect of the operand and/or the affect of an instruction upon its operand, or the method by which a processor operates upon the instruction and the instruction operand. In the example set forth herein, the instruction is a load/store instruction, the instruction operand is a memory location decoded into gating storage 100 such that sixteen views are available to redefine some aspect of the operation of the load/store instruction relative to this memory location. Specifically in the preferred embodiment, the views define possible synchronization constructs, functions, or methods that may be used accessing the particular memory location, such as using an Empty/Full primitive or a P/V semaphore. An inter-thread communication control unit (ITU), e.g., control logic 125 or the ITU as described in the incorporated patent application, accesses a memory location consistent with the desired synchronization construct selected by the appropriate view. In other cases, the constructs, functions, or methods maybe other than synchronization-related for load/store instructions. In some cases, other instructions may be processed through a memory system having access method functions applied dependent upon an associated operand.

Gating storage is an attribute of memory which may optionally be supported by processors implementing embodiments of the present invention. The user-mode load/store semantics of gating storage are identical with those of normal memory, except that completion of the operation may be blocked for unbounded periods of time. The distinguishing feature of gating storage is that outstanding load or store operations can be aborted and restarted. Preferably it is a TLB-mediated property of a virtual page whether or not a location is treated as gating storage (though other mechanisms may be implemented to identify gating storage locations).

When a load or store operation is performed on gating storage, no instructions beyond the load/store in program order are allowed to alter software-visible states of the system until a load result or store confirmation is returned from storage. In the event that an exception is taken using the thread context of an instruction stream which is blocked on a load/store to gating storage, or in the event where such a thread is halted by setting a ThreadStatus.H bit of the associated thread context, the pending load/store operation is aborted.

When a load or store is aborted, the abort is signaled to the storage subsystem, such that the operation unambiguously either completes or is abandoned without any side effects. When a load operation is abandoned, any hardware interlocks on the load dependence are released, so that the destination register may be used as an operand source, with its preload value.

After an aborted and abandoned load/store, a program counter as seen by the exception program counter register and the branch delay state as seen by a Cause.BD bit are set so as that an execution of an exception return (ERET) by the instruction stream associated by the thread context, or a clearing of the thread context halted state, causes a re-issue of the gating load/store. Gating storage accesses are never cached, and multiple stores to a gating storage address are never merged by a processor.

While the preceding description provides a complete description of a specific implementation of a gating storage for inter-thread communication in the synchronization of load/store instructions, the present invention has a broader implementation as well. In the more generalized case, gating storage provides a simple and efficient mechanism to extend an instruction set (particularly advantageous to processors implementing RISC instruction sets). This aspect of the present invention uses an operand of an instruction to modify, enhance, substitute, or otherwise affect an instruction using hardware features. In the load/store example used throughout this discussion, the gating storage adds multiple load/store commands to the basic instruction set, each of the added commands a variant of the basic command but including a hardware-managed instruction that implements a wide variety of synchronization constructs in the process of completing a load or a store. Normal loads/stores are still available by not including an operand within the gating storage. However, by modifying an instruction by use of special memory having special instruction functions/methods triggered from the operand may be implemented to extend many types of instructions in many different ways.

The inherently restricted number and complexity of instruction operand encodings in a "RISC" instruction set is augmented by adding computational semantics to basic instructions (e.g., RISC storage access instructions such as loads and stores), by using an instruction context (e.g., a portion of the storage address of the load or store as an opcode extension) to express a calculation or control function to be executed. This provides that an instruction may have a default instruction method and one or more variations that are implemented responsive to the instruction context. The preferred embodiment of the present invention described above provides for a standard load/store instruction to be extended using specifically chosen synchronization functions to be used instead of the standard instruction method when the target address is a data storage location in the gating storage. The preferred embodiment implements many "flavors" of the alternate synchronizing instruction method through the views (which may be referred to as access method functions) that tune a particular synchronizing load/store using the desired synchronization method.

A problem addressed by this "extension" aspect of the present invention is that some implementations of MIPS Technologies, Inc. processors required a range of synchronizing operations that could not reasonably be directly encoded in an extension to the MIPS32/MIPS64 instruction set. The present invention uses a memory-like space for designated interthread communication storage (ITC) that allowed a potentially very large number of synchronized, shared variables. A number of operations were to be available for each location: synchronized loads/stores, semaphore operations, bypass accesses to data and control information, etc., and it was desirable for synchronized loads and stores to be available for the full range of memory data types supported by the MIPS32/MIPS64 architecture: byte, halfword, word, and doubleword.

Rather than invent new instructions that perform distinct operations on the memory address expressed to the instruction, the preferred embodiment treats loads and stores to the designated ITC memory space as "load-plus-operation" and "store-plus-operation" instructions, where the "operation" is determined by decoding of a subset of the bits of the effective address of the load or store instruction. In the case of the preferred embodiment, this has evolved from using a pair of bits ($24$ and $23$) as a four-element opcode space, performing Empty/Full synchronization, "forcing", "bypass", and "control" operations on the ITC variable referenced by the higher-order address bits, to the current scheme where four bits, $26$ through $23$, are used to create a 16-opcode space, in which the system defines "bypass", "control", Empty/Full synchronization, Empty/Full "try" operations, Blocking semaphore "P" and "V" operations, and Semaphore "try" operations. This is but one example of how an instruction may be extended using a context of the instruction to determine an applicable instruction method to be used. Other extensions are possible to load/store instructions, other extensions are possible for other instructions, particularly those having an associated operand. However, other instructions may be extended by using some other contextual information to differentiate between instances in which a default instruction method is to be used and when an alternate instruction method. In the present context, instruction methods are the procedures implemented by a processor in executing an instruction. The extension aspect of the present invention provides for a different set of procedures to be used when executing the same instruction when a context of the instruction indicates that a different implementation should be used.

The invention described in this application may, of course, be embodied in hardware; e.g., within or coupled to a Central Processing Unit ("CPU"), microprocessor, microcontroller, System on Chip ("SOC"), or any other programmable device. Additionally, embodiments may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. Embodiments of the invention embodied in software may be included in a semiconductor intellectual property core (e.g., embodied in HDL) and transformed to hardware in the production of integrated circuits. Additionally, implementations of the present invention may be embodied as a combination of hardware and software.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention may be achieved by any means as is known in the art. Distributed, or networked systems, components and circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope of the present invention to implement a program or code that may be stored in a machine-readable medium or transmitted using a carrier wave to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The above-described arrangements of apparatus and methods are merely illustrative of applications of the principles of this invention and many other embodiments and modifications may be made without departing from the spirit and scope of the invention as defined in the claims.

These and other novel aspects of the present invention will be apparent to those of ordinary skill in the art upon review of the drawings and the remaining portions of the specification. Therefore, the scope of the invention is to be determined solely by the appended claims.

What is claimed is:

1. A data storage location access control system, comprising:
    a memory system including a plurality of data storage locations, each said data storage location associated with a set of views including a first view and a second view with said memory system producing a particular one view from a particular one set of views associated with the data storage location responsive to a set of control bits derived from a data access instruction operand including an address identifying the data storage location, wherein said first and second views specify different ways for controlling access to the data storage location, wherein the data storage location identified by said address included in said data access instruction operand is for storing data rather than an instruction; and
    a controller, coupled to said memory system, for controlling access to the data storage location using said particular one view.

2. The data storage location access control system of claim 1, wherein said memory system is coupled to a plurality of virtual processing elements (VPEs).

3. The data storage location access control system of claim 1, wherein said set of control bits includes:
    a first control subset derived from a number N of high order bits of said memory address; and
    a second control subset derived from a number M of untranslated bits of said memory address.

4. The data storage location access control system of claim 1, further comprising:
    one or more state bits for controlling access to the data storage location according to said first and second views, wherein said first view includes an Empty/Full synchronized view and said second view includes a P/V semaphore synchronized view.

5. The data storage location access control system of claim 3, further comprising:
    one or more state bits for controlling access to the data storage location according to said first and second views, wherein said first view includes an Empty/Full synchronized view and said second view includes a P/V semaphore synchronized view.

6. The data storage location access control system of claim 5, wherein said particular one set of views is selected responsive to said first control subset and wherein said particular one view is selected responsive to said second control subset.

7. A data storage location access control method, comprising:
a) applying a data access instruction for the data storage location to a memory system, said memory system including a plurality of data storage locations, each said data storage location associated with a set of views including a first view and a second view with said memory system producing a particular one view from a particular one set of views associated with the data storage location responsive to a set of control bits derived from an operand of said access instruction including an address identifying the data storage location, wherein said first and second views specify different ways for controlling access to the data storage location, wherein the data storage location identified by said address included in said data access instruction operand is for storing data rather than an instruction;
b) producing said particular one view from said particular one set of views; and
c) controlling access to the data storage location using said particular one view.

8. The data storage location access control method of claim 7, wherein said memory system is coupled to a plurality of virtual processing elements (VPEs).

9. The data storage location access control method of claim 7, wherein said set of control bits includes:
a first control subset derived from a number N of high order bits of said address;
and a second control subset derived from a number M of untranslated bits of said memory address.

10. The data storage location access control method of claim 7, wherein said memory system comprises:
one or more state bits for controlling access to the data storage location according to said first and second views,
wherein said first view includes an Empty/Full synchronized view and said second view includes a P/V semaphore synchronized view.

11. The data storage location access control method of claim 9, wherein said memory system comprises:
one or more state bits for controlling access to the data storage location according to said first and second views,
wherein said first view includes an Empty/Full synchronized view and said second view includes a P/V semaphore synchronized view.

12. The data storage location access control method of claim 11, further comprising:
selecting, responsive to said first control subset, said particular one set; and
selecting, responsive to said second control subset, said particular one view.

13. A computer program product comprising a computer readable storage medium carrying program instructions for accessing a data storage location when executed using a computing system, the executed program instructions executing a method, the method comprising:
a) applying a data access instruction for the data storage location to a memory system, said memory system including a plurality of data storage locations, each said data storage location associated with a set of views including a first view and a second view with said memory system producing a particular one view from a particular one set of views associated with the data storage location responsive to a set of control bits derived from an operand of said access instruction including an address identifying the data storage location, wherein said first and second views specify different ways for controlling access to the data storage location, wherein the data storage location identified by said address included in said data access instruction operand is for storing data rather than an instruction;
b) producing said particular one view from said particular one set of views; and
c) controlling access to the data storage location using said particular one view.

14. The computer program product of claim 13, wherein said memory system is coupled to a plurality of virtual processing elements (VPEs).

15. The computer program product of claim 13, wherein said set of control bits includes:
a first control subset derived from a number N of high order bits of said memory address; and
a second control subset derived from a number M of untranslated bits of said memory address.

16. The computer program product of claim 13, wherein said memory system comprises:
one or more state bits for controlling access to the data storage location according to said first and second views,
wherein said first view includes an Empty/Full synchronized view and said second view includes a P/V semaphore synchronized view.

17. The computer program product of claim 15, wherein said memory system comprises:
one or more state bits for controlling access to the data storage location according to said first and second views,
wherein said first view includes an Empty/Full synchronized view and said second view includes a P/V semaphore synchronized view.

18. The computer program product of claim 17, the method further comprising:
selecting, responsive to said first control subset, said particular one set; and
selecting, responsive to said second control subset, said particular one view.

19. A data storage location access control apparatus, comprising:
means for applying a data access instruction for the data storage location to a memory system, said memory system including a plurality of data storage locations, each said data storage location associated with a set of views including a first view and a second view with said memory system producing a particular one view from a particular one set of views associated with the data storage location responsive to a set of control bits derived from an operand of said data access instruction including an address identifying the data storage location, wherein said first and second views specify different ways for controlling access to the data storage location, wherein the data storage location identified by said address included in said data access instruction operand is for storing data rather than an instruction;
means for producing said particular one view from said particular one set of views; and
means for controlling access to the data storage location using said particular one view.

20. A method for controlling access to a data storage location, comprising:
   a) producing a particular one view from a memory system including a plurality of data storage locations, each said data storage location associated with a set of views including one or more views with said memory system producing said particular one view from a particular one set of views associated with the data storage location responsive to a set of control bits derived from an instruction operand including an address identifying the data storage location, wherein said first and second views specify different ways for controlling access to the data storage location, wherein the instruction specifies a transfer of data and a software-visible register of the microprocessor to the data storage location; and
   b) accessing the data storage location using said particular one view.

21. A computer program product comprising a computer readable storage medium carrying program instructions for accessing a data storage location when executed using a computing system, the executed program instructions executing a method, the method comprising:
   a) producing a particular one view from a memory system including a plurality of data storage locations, each said data storage location associated with a set of views including one or more views with said memory system producing said particular one view from a particular one set of views associated with the data storage location responsive to a set of control bits derived from an instruction operand including an address identifying the data storage location, wherein said first and second views specify different ways for controlling access to the data storage location, wherein the instruction specifies a transfer of data from a software-visible register of the microprocessor to the data storage location; and
   b) accessing the data storage location using said particular one view.

22. An apparatus for extending a load/store instruction having a target address, the apparatus comprising:
   a memory system having a view associated with a data storage location identified by a tag derived from the target address, said data storage location associated with the load/store instruction, said memory system responsive to the target address to produce a particular view for the load/store instruction from said memory system; and
   a controller, coupled to said data storage location and to said memory system, for implementing a load/store method for the load/store instruction using said particular view.

23. The apparatus of claim 22, wherein said target address is an operand of the load/store instruction for the data storage location.

24. The apparatus of claim 22, wherein said particular view facilitates said controller in using said load/store method for the load/store instruction to said data storage location.

25. The apparatus of claim 22, wherein said memory system associates both a first view and a second view with said data storage location and wherein said memory system is responsive to the target address to select one of said first view and said second view as said particular view.

26. The apparatus of claim 25, further comprising:
   one or more state bits for controlling access to the data storage location according to said first and second views, wherein each said view includes a synchronized view.

27. A method for extending a load/store instruction having a target address, the method comprising:
   a) producing, responsive to the target address, a particular view for the load/store instruction from a memory system, said memory system having a view associated with a data storage location identified by a tag derived from the target address, said data storage location associated with the load/store instruction; and
   b) implementing a load/store method for the load/store instruction using said particular view.

28. The method of claim 27, wherein said target address is an operand of the load/store instruction for the data storage location.

29. The method of claim 27, wherein said particular view facilitates said controller to implement said load/store method for said load/store instruction to said data storage location.

30. The method of claim 27, further comprising:
   controlling, responsive to said particular view, access of said data storage location by the load/store instruction using said load/store method.

31. The method of claim 30, wherein said data storage location is a memory shared among a plurality of concurrent processes and said load/store method is a synchronization method for synchronizing accesses to said data storage location by said plurality of concurrent processes.

32. The method of claim 27, wherein said view associated with said data storage location is a first view and wherein said memory system has a second view associated with said data storage location.

33. The method of claim 32, further comprising:
   selecting, responsive to a set of control bits derived from the target address, one of said first and second views as said particular view.

34. A computer program product comprising a computer readable storage medium carrying program instructions for extending a load/store instruction having a target address when executed using a computing system, the executed program instructions executing a method, the method comprising:
   a) producing, responsive to the target address, a particular view for the load/store instruction from a memory system, said memory system having a view associated with a data storage location identified by a tag derived from the target address, said data storage location associated with the load/store instruction; and
   b) implementing a load/store method for the load/store instruction using said particular view.

35. The computer program product of claim 34, wherein said target address is an operand of the load/store instruction for the data storage location.

36. The computer program product of claim 34, wherein said particular view facilitates implementation of said load/store method for said load/store instruction to said data storage location.

37. The computer program product of claim 34, the method further comprising:
   controlling, responsive to said particular view, access of said data storage location by the load/store instruction using said load/store method.

38. The computer program product of claim 37, wherein said data storage location is a memory shared among a plurality of concurrent processes and said load/store method is a synchronization method for synchronizing accesses to said data storage location by said plurality of concurrent processes.

39. The computer program product of claim 34, wherein said view associated with said data storage location is a first view and wherein said memory system has a second view associated with said data storage location.

40. A shared resource access control system, comprising:
a storage structure responsive to a plurality of control references, with each said control reference derived from a data access instruction operand including an access reference identifying the shared resource, said storage structure including a plurality of sets of access method functions at least one set associated with each of a plurality of shared resources, with each said set of access method functions including a first access method function and a second access method function with said storage structure producing a particular one access method function from a particular one set associated with the shared resource responsive to said control references, wherein said first and second access method functions specify different ways for controlling access to the shared resource, wherein the shared resource identified by said access reference included in said data access instruction operand is for storing data rather than an instruction; and
a controller, coupled to said storage structure, for controlling access to the shared resource using said particular one access method function.

41. A shared resource access control method, comprising:
a) applying a data access instruction for a shared resource identified by an access reference to a storage structure that includes said shared resource, said storage structure responsive to a plurality of control references with each said control reference derived from an operand of said data access instruction including said access reference, said storage structure including a plurality of sets of access method functions at least one set associated with each of a plurality of shared resources, with each said set of access method functions including a first access method function and a second access method function, wherein said first and second access method functions specify different ways for controlling access to the shared resource, wherein the shared resource identified by said access reference including in said data access instruction operand is for storing data rather than an instruction;
b) producing a particular one access method function from a particular one set associated with the shared resource responsive to said control references; and
c) controlling access to the shared resource using said particular one access rule function.

42. A computer program product comprising a computer readable storage medium carrying program instructions for accessing a shared resource when executed using a computing system, the executed program instructions executing a method, the method comprising:
a) applying a data access instruction for a shared resource identified by an access reference to a storage structure that includes said shared resource, said storage structure responsive to a plurality of control references with each said control reference derived from an operand of said data access instruction including said access reference, said storage structure including a plurality of sets of access method functions at least one set associated with each of a plurality of shared resources, with each said set of access method functions including a first access method function and a second access method function, wherein said first and second access method functions specify different ways for controlling access to the shared resource, wherein the shared resource identified by said access reference included in said data access instruction operand is for storing data rather than an instruction;
b) producing a particular one access method function from a particular one set associated with the shared resource responsive to said control references; and
c) controlling access to the shared resource using said particular one access rule function.

43. A method for selectively extending a non-control transfer instruction having a default instruction method, the method comprising:
a) determining whether the non-control transfer instruction is to be extended through use of an alternate instruction method for the non-control transfer instruction responsive to a context of the non-control transfer instruction wherein said alternate instruction method differs from the default instruction method, wherein said context of the non-control transfer instruction comprises a plurality of bits of an address operand of the non-control transfer instruction; and
b) using said alternate instruction method for the non-control transfer instruction when the non-control transfer instruction is to be extended.

44. The method of claim 43, wherein said alternate instruction method uses an instruction method function.

45. The method of claim 44, wherein said instruction method function includes:
one or more state bits stored in a data structure associated with a resource used in said alternate instruction method.

46. The method of claim 43, wherein the instruction is a memory access instruction with a target address included in said address operand, the instruction providing for the default instruction method to access a first memory location identified by said address operand, wherein said alternate instruction method includes implementation of a synchronizing memory access with respect to a second memory location identified by said address operand, and wherein a particular instruction method to be implemented is determined by said address operand.

47. The method of claim 45, wherein the instruction is a memory access instruction with a target address included in said address operand and said resource is a memory storage location in a memory system identified by said target address, the instruction providing for the default instruction method to access a first memory location, wherein said alternate instruction method includes implementation of a synchronizing memory access with respect to a second memory location identified by said address operand, and wherein a particular instruction method to be implemented is determined by said address operand with said address operand selecting said one or more state bits from said data structure when said particular instruction method is said alternate instruction method.

48. The method of claim 43, wherein said alternate instruction method includes a plurality of alternate implementations for each said context, wherein a particular one alternate implementation is selected for said alternate instruction method responsive to said context.

49. The method of claim 48, wherein said context includes:
an operand associated with the instruction; and
said particular one alternate implementation is selected for said alternate instruction method responsive to said operand.

50. The method of claim 49, wherein said alternate implementations use a plurality of alternate instruction method functions, at least one function for each implementation.

51. The method of claim 50, wherein each said instruction method function for each context includes:
one or more state bits stored in a common data structure associated with said address operand,
wherein a particular set of said one or more state bits is selected from said data structure responsive to said address operand.

52. The method of claim 48, wherein the instruction is a memory access instruction with a target address included in said address operand, the instruction providing for the default instruction method to access a first memory location identified by said address operand, wherein said alternate instruction method includes different implementations of a synchronizing memory access with respect to a second memory location identified by said address operand, and wherein a particular instruction method to be implemented is determined by said address operand.

53. The method of claim 51, wherein the instruction is a memory access instruction with a target address included in said address operand and said resource is a memory storage location in a memory system identified by said target address, the instruction providing for the default instruction method to access a first memory location, wherein said alternate instruction method includes different implementation of a synchronizing memory access with respect to a second memory location identified by said address operand, and wherein a particular instruction method to be implemented is determined by said address operand with said address operand selecting said one or more state bits of said particular set from said data structure when said particular instruction method is said alternate instruction method.

54. A computer program product comprising a computer readable storage medium carrying program instructions for selectively extending a non-control transfer instruction having a default instruction method when executed using a computing system, the executed program instructions executing a method, the method comprising:
a) determining whether the non-control transfer instruction is to be extended through use of an alternate instruction method for the non-control transfer instruction responsive to a context of the non-control transfer instruction wherein said alternate instruction method differs from the default instruction method, wherein said context of the non-control transfer instruction comprises a plurality of bits of an address operand of the non-control transfer instruction; and
b) using said alternate instruction method for the non-control transfer instruction when the non-control transfer instruction is to be extended.

55. An apparatus, comprising:
means for determining whether a non-control transfer instruction is to be extended through use of an alternate instruction method for the non-control transfer instruction responsive to a context of the non-control transfer instruction wherein said alternate instruction method differs from the default instruction method, wherein said context of the non-control transfer instruction comprises a plurality of bits of an address operand of the non-control transfer instruction; and
means for using said alternate instruction method for the non-control transfer instruction when the non-control transfer instruction is to be extended.

56. An apparatus for selectively extending a non-control transfer instruction having a default instruction method, comprising:
a context evaluator for determining whether the non-control transfer instruction is to be extended through use of an alternate instruction method for the non-control transfer instruction responsive to a context of the non-control transfer instruction wherein said alternate instruction method differs from the default instruction method, wherein said context of the non-control transfer instruction comprises a plurality of bits of an address operand of the non-control transfer instruction; and
a controller using said alternate instruction method for the non-control transfer instruction when the non-control transfer instruction is to be extended.

57. A method for selectively extending an instruction having a default instruction method, the method comprising:
a) determining whether the instruction is to be extended through use of an alternate instruction method applied to the instruction responsive to an operand of the instruction, wherein the operand is configured to specify up to N possible memory addresses for identifying N/M storage locations of a memory system, where M is greater than 1; and
b) using said alternate instruction method for the instruction when the operand specifies a first memory address that identifies a first of the N/M storage locations, and using the default instruction method if the operand specifies a second memory address that also identifies the first of the N/M storage locations, wherein the first and second memory addresses are different.

58. A computer program product comprising a computer readable storage medium carrying program instructions for selectively extending an instruction having a default instruction method when executed using a computing system, the executed program instructions executing a method, the method comprising:
a) determining whether the instruction is to be extended through use of an alternate instruction method applied to the instruction responsive to an operand of the instruction, wherein the operand is configured to specify up to N possible memory address for identifying N/M storage locations in a memory system, wherein M is greater than 1; and
b) using said alternate instruction method for the instruction when the operand specifies a first memory address that identifies a first of the N/M storage location, and using the default instruction method if the operand specifies a second memory address that also identifies the first of the N/M storage locations, wherein the first and second memory addresses are different.

59. An apparatus, comprising:
means for determining whether the instruction is to be extended through use of an alternate instruction method applied to the instruction responsive to an operand of the instruction, wherein the operand is configured to specify up to N possible memory addresses for identifying N/M storage locations in a memory system, wherein M is greater than 1; and
means for using said alternate instruction method for the instruction when the operand specifies a first memory address that identifies a first of the N/M storage locations, said means configured for using a default instruction method if the operand specifies a second memory address that also identifies the first of the N/M storage locations, wherein the first and second memory addresses are different.

60. An apparatus for selectively extending an instruction having a default instruction method, comprising:
a context evaluator for determining whether the instruction is to be extended through use of an alternate instruction method applied to the instruction responsive to an operand of the instruction, wherein the operand is configured to specify up to N possible memory addresses for identifying N/M storage locations in a memory system, wherein M is greater than 1; and a controller using said alternate instruction method for the instruction when the operand specifies a first memory address that identifies a first of the N/M storage locations, wherein the controller uses the default instruction method if the operand specifies a second memory address that also identifies the first of the N/M storage locations, wherein the first and second memory addresses are different.

61. A method for selectively extending a load/store instruction having a default load/store method, the method comprising:
   a) determining whether the load/store instruction is to be extended through use of a synchronizing load/store method for the load/store instruction responsive to a target address of the load/store instruction wherein said synchronizing load/store method differs from the default load/store method; and
   b) using said synchronizing load/store method for the load/store instruction when the load/store instruction is to be extended.

62. A computer program product comprising a computer readable storage medium carrying program instructions for selectively extending a load/store instruction having a default load/store method when executed using a computing system, the executed program instructions executing a method, the method comprising:
   a) determining whether the load/store instruction is to be extended through use of a synchronizing load/store method for the load/store instruction responsive to a target address of the load/store instruction wherein said synchronizing load/store method differs from the default load/store method; and
   b) using said synchronizing load/store method for the load/store instruction when the load/store instruction is to be extended.

63. An apparatus for selectively extending a load/store instruction having a default load/store method, comprising:
   a context evaluator for determining whether the load/store instruction is to be extended through use of a synchronizing load/store method for the load/store instruction responsive to a target address of the load/store instruction wherein said synchronizing load/store method differs from the default load/store method; and
   a controller using said synchronizing load/store method for the load/store instruction when the load/store instruction is to be extended.

64. An apparatus for selectively extending a load/store instruction having a default instruction method, comprising:
   means for determining whether the load/store instruction is to be extended through use of a synchronizing load/store method for the load/store instruction responsive to a target address of the load/store instruction, wherein said synchronizing load/store method differs from the default load/store method; and
   means for using said synchronizing load/store method for the load/store instruction when the load/store instruction is to be extended.

65. A data storage system responsive to a load/store instruction having a target address, comprising:
   a data memory having a plurality of data storage locations, said data memory identifying a particular data storage location responsive to the target address of the load/store instruction; and
   a view directory storing view control information associated with each data storage location of said plurality of storage locations, said view control information for controlling access to the data storage location according to a plurality of views, said view directory identifying a particular one view responsive to the target address of the load/store instruction.

66. A data storage method responsive to a load/store instruction having a target address, the method comprising:
   a) identifying, responsive to the target address of the load/store instruction, a particular data storage location from a data memory having a plurality of data storage locations; and
   b) identifying, responsive to the target address of the load/store instruction, a particular one view from a view directory storing view control information associated with each data storage location of said plurality of storage locations, said view control information for controlling access to the data storage location according to a plurality of views.

67. A computer program product comprising a computer readable storage medium carrying program instructions for producing data responsive to a load/store instruction having a target address when executed using a computing system, the executed program instructions executing a method, the method comprising:
   a) identifying, responsive to the target address of the load/store instruction, a particular data storage location from a data memory having a plurality of data storage locations; and
   b) identifying, responsive to the target address of the load/store instruction, a particular one view from a view directory storing view control information associated with each data storage location of said plurality of storage locations, said view control information for controlling access to the data storage location according to a plurality of views.

68. A data storage apparatus responsive to a load/store instruction having a target address, comprising:
   means for identifying, responsive to the target address of the load/store instruction, a particular data storage location from a data memory having a plurality of data storage locations; and
   means for identifying, responsive to the target address of the load/store instruction, a particular one view from a view directory storing view control information associated with each data storage location of said plurality of storage locations, said view control information for controlling access to the data storage location according to a plurality of views.

69. The data storage location access control system of claim 1, wherein using said first view, said controller controls access to the data storage location with a default access method, and wherein using said second view, said controller controls access to the data storage location with a synchronized access method.

70. The data storage location access control system of claim 1, wherein said memory system produces said first view responsive to a first value of said control bits and produces said second view responsive to a second value of said control bits.

71. The data storage location access control method of claim 7, wherein said controlling access to the data storage location using said particular one view comprises:
   using said first view to control access to the data storage location with a default access method; and using said second view to control access to the data storage location with a synchronized access method.

72. The data storage location access control method of claim 7, wherein said producing said particular one view from said particular one set of views comprises:
   producing said first view responsive to a first value of said control bits; and
   producing said second view responsive to a second value of said control bits.

73. The computer program product of claim 13, wherein said controlling access to the data storage location using said particular one view comprises:
   using said first view to control access to the data storage location with a default access method; and
   using said second view to control access to the data storage location with a synchronized access method.

74. The computer program product of claim 13, wherein said producing said particular one view from said particular one set of views comprises:
   producing said first view responsive to a first value of said control bits; and
   producing said second view responsive to a second value of said control bits.

* * * * *

UNITED STATES PATENT AND TRADEMARK OFFICE
CERTIFICATE OF CORRECTION

PATENT NO. : 7,711,931 B2
APPLICATION NO. : 10/954988
DATED : May 4, 2010
INVENTOR(S) : Kevin D. Kissell It is certified that error appears in the above-identified patent and that said Letters Patent is hereby corrected as shown below:

Title Page
In column 1 of the patent, INID code (63), please replace:

"Continuation-in-part of application No. 10/929,342, filed on Aug. 27, 2004, now Pat. No. 7,321,965, and a continuation-in-part of application No. 10/929,102, filed on Aug. 27, 2004, and a continuation-in-part of application No. 10/928,746, filed on Aug. 27, 2004, and a continuation-in-part of application No. 10/929,097, filed on Aug. 27, 2007, and a continuation-in-part of application No. 10/684,350, filed on Oct. 10, 2003, and a continuation-in-part of application No. 10/684,348, filed on Oct. 10, 2003, said application No. 10/929,342 is a continuation-in-part of application No. 10/684,350, filed on Oct. 10, 2003, and a continuation-in-part of application No. 10/684,348, filed on Oct. 10, 2003, said application No. 10/929,102 is a continuation-in-part of application No. 10/684,350, filed on Oct. 10, 2003, and a continuation-in-part of application No. 10/684,348, filed on Oct. 10, 2003, said application No. 10/928,746 is a continuation-in-part of application No. 10/684,350, filed on Oct. 10, 2003, and a continuation-in-part of application No. 10/684,348, filed on Oct. 10, 2003, said application No. 10/929,097 is a continuation-in-part of application No. 10/684,350, filed on Oct. 10, 2003, and a continuation-in-part of application No. 10/684,348, filed on Oct. 10, 2003."

with:

--Continuation-in-part of application No. 10/929,342, filed on Aug. 27, 2004, now Pat, No. 7,321,965, and a continuation-in-part of application No. 10/929,102, filed on Aug. 27, 2004, and a continuation-in-part of application No. 10/928,746, filed on Aug. 27, 2004, and a continuation-in-part of application No. 10/929,097, filed on Aug. 27, 2007, and a continuation-in-part of application No. 10/684,350, filed on Oct. 10, 2003, and a continuation-in-part of application No. 10/684,348, filed on Oct. 10, 2003, said application No. 10/929,342 is a continuation-in-part of application No. 10/684,350, filed on Oct. 10, 2003, and a continuation-in-part of application No. 10/684,348, filed on Oct. 10, 2003, application No. 10/929,342 also claims the benefit of Provisional application No. 60/502,359, filed Sept. 12, 2003, Provisional application No. 60/502,358, filed Sept. 12, 2003, and Provisional application No. 60/499,180, filed Aug. 28, 2003, said application No. 10/929,102 is a continuation-in-part of application No. 10/684,350, filed on Oct. 10, 2003, and a continuation-in-part of application No. 10/684,348, filed on Oct. 10, 2003, application No. 10/929,102 also claims the Signed and Sealed this Twenty-first Day of December, 2010

David J. Kappos
*Director of the United States Patent and Trademark Office* benefit of Provisional application No. 60/502,359, filed Sept. 12, 2003, Provisional application No. 60/502,358, filed Sept. 12, 2003, and Provisional application No. 60/499,180, filed Aug. 28, 2003, said application No. 10/928,746 is a continuation-in-part of application No. 10/684,350, filed on Oct. 10, 2003, and a continuation-in-part of application No. 10/684,348, filed on Oct. 10, 2003, application No. 10/928,746 also claims the benefit of Provisional application No. 60/502,359, filed Sept. 12, 2003, Provisional application No. 60/502,358, filed Sept. 12, 2003, and Provisional application No. 60/499,180, filed Aug. 28, 2003, and said application No. 10/929,097 is a continuation-in-part of application No. 10/684,350, filed on Oct. 10, 2003, and a continuation-in-part of application No. 10/684,348, filed on Oct. 10, 2003, application No. 10/929,097 also claims the benefit of Provisional application No. 60/502,359, filed Sept. 12, 2003, Provisional application No. 60/502,358, filed Sept. 12, 2003, and Provisional application No. 60/499,180, filed Aug. 28, 2003, said application No. 10/684,350 also claims the benefit of Provisional application No. 60/502,359, filed Sept. 12, 2003, Provisional application No. 60/502,358, filed Sept. 12, 2003, and Provisional application No. 60/499,180, filed Aug. 28, 2003, and said application 10/684,348 also claims the benefit of Provisional application No. 60/502,359, filed Sept. 12, 2003, Provisional application No. 60/502,358, filed Sept. 12, 2003, and Provisional application No, 60/499,180, filed Aug. 28, 2003.--

In column 2 of the Title page of the patent, INID code (60), please remove the following:

"Provisional application No. 60/499,180, filed on Aug. 28, 2003, provisional application No. 60/502,358, filed on Sep. 12, 2003, provisional application No. 60/502,359, filed on Sep. 12, 2003."